United States Patent
Veerling et al.

[15] 3,693,665
[45] Sept. 26, 1972

[54] PIPELINE FOR THE TRANSPORT OF COLD LIQUIDS

[72] Inventors: Coenraad W. N. Veerling, Amsterdam; Victor A. Grossen, Hague, both of Netherlands

[73] Assignee: Shell Oil Company, New York, N.Y.

[22] Filed: Jan. 4, 1971

[21] Appl. No.: 103,556

[52] U.S. Cl..................................138/149, 138/114
[51] Int. Cl................................................F16l 9/14
[58] Field of Search..............................138/149, 114

[56] References Cited

UNITED STATES PATENTS 2,924,245   2/1960   Wilson........................138/149
2,361,383   10/1944  Coffman......................138/149
2,857,931   10/1958  Lawton.....................138/149 X
2,451,146   10/1948  Baker.........................138/149
3,471,177   10/1969  Garrett.....................138/114 X

*Primary Examiner*—Herbert F. Ross
*Attorney*—F. Marlowe and Harold L. Denkler

[57] ABSTRACT

Pipeline for cold liquids made of coaxial pipes and insulation therebetween, one of the pipes being under axial compression and the other being under axial tension, buckling being prevented by the elastic support of the insulation between the pipes.

16 Claims, 7 Drawing Figures

Coenraad W.N. Veerling
Victor A. Grossen
INVENTORS

Coenraad W. N. Veerling
Victor A. Grossen
INVENTORS

Coenraad W. N. Veerling
Victor A. Grossen
INVENTORS

PIPELINE FOR THE TRANSPORT OF COLD LIQUIDS

BACKGROUND OF THE INVENTION

1. Field of the Invention

The present invention relates to a pipeline for the transport of cold liquids, in particular liquefied natural gas, which is intended in particular for use under water, but also is suitable for use on land.

2. Description of the Prior Art

As a result of the low temperatures of some liquids being transported (in the case of liquified natural gas about minus 160° C) and the use under water of pipelines carrying such liquids, a pipeline of the type needed has to meet certain stringent requirements.

As a result of the low temperatures, the choice of the pipe material is limited to those materials which still possess sufficient ductility at the low temperatures anticipated. Materials which meet this requirement at the low temperature of liquefied natural gas are, for instance, 9 percent nickel-steel, austenitic steels or aluminum.

In addition, the low temperatures cause large displacements through shrinkage. Cooling of a line having a length of 1 km from ambient temperature to minus 160° C will cause a displacement through shrinkage of approximately 2 m in the case of a 9 percent nickel steel line and of approximately 4 m in the case of an aluminum line.

In view of the low temperature of the liquid to be transported, the pipeline should of course have good heat-insulating properties.

When using the pipeline under water, a good watertight heat-insulation is required, and it is desirable that, if water leaks into the insulation system, locally, the line remains operational without too large a heat inflow until a convenient moment for repair has arrived.

In addition, using the line under water requires the line to be strong so that laying, which is mostly done from a vessel, does not cause damage of the line and/or the heat-insulating system.

A known pipeline for cold liquids includes an inner pipe and a coaxial outer pipe having a larger diameter than the inner pipe, the ends of the inner and outer pipe being connected, while a heat-insulating material is present in the space between the inner and outer pipe.

In principle, a pipeline of this type is suitable for this purpose. The outer pipe which may, for example, be made of carbon steel, protects the heat-insulating material both during laying and during use of the line. In addition, the outer pipe acts as a shell against penetration of water into the heat-insulating material. Finally, in order to prevent floating-up of the line, ballast (for example a concrete shell around the outer pipe) or anchoring means may be applied onto or around the outer pipe in a simple manner.

In known pipelines of the above type, the shrinkage of the inner pipe is absorbed without great stresses by using bellows between successive inner pipes, or by providing the inner pipe with corrugations for part of all of its length.

The latter pipelines, however, have various disadvantages. Bellows are weak points in a pipeline and repair or replacement is often difficult or impossible, especially in the case of submerged pipelines. Besides, bellows or corrugations have the disadvantage of causing extra flow resistance. Moreover, a corrugated inner pipe can only be produced by one of the few specialized manufacturers.

It is the object of the present invention to provide a pipeline which does not have the above disadvantages and which is of a simple construction.

SUMMARY OF THE INVENTION

The pipeline of this invention is characterized in that the inner pipe is made without flexible elements such as bellows or corrugations, and that the connection between the ends of the inner pipe and the outer pipe is such that the outer or the inner pipe (at normal temperature or at operating temperature) is under axial compression stress, buckling of the pipes being counteracted by the presence of a heat-insulating material in the space between the inner pipe and the outer pipe so that the one pipe elastically supports the other via the heat-insulating material.

A first embodiment of a pipeline based on the latter principle is characterized in that the ends of the inner and the outer pipes are connected to each other in such a way that, when the pipes are at ambient temperature no, or only slight, axial stresses occur in the inner and the outer pipes, but when the inner pipe cools to operating temperature (the normal situation during transportation of cold liquid through the line), the inner pipe is under axial tensile stress and the outer pipe is under axial compression stress. This embodiment will be designated below as the restrained type of line.

A second embodiment based on the above principle is characterized in that the inner and outer pipes are connected to each other in such a way that when the pipes are at ambient temperature, the outer and the inner pipes are prestressed in such a manner that the outer pipe is under axial tensile stress and the inner pipe is under axial compression stress. This embodiment will be designated below as the prestressed type of line.

DESCRIPTION OF THE PREFERRED EMBODIMENTS

Figure 1:
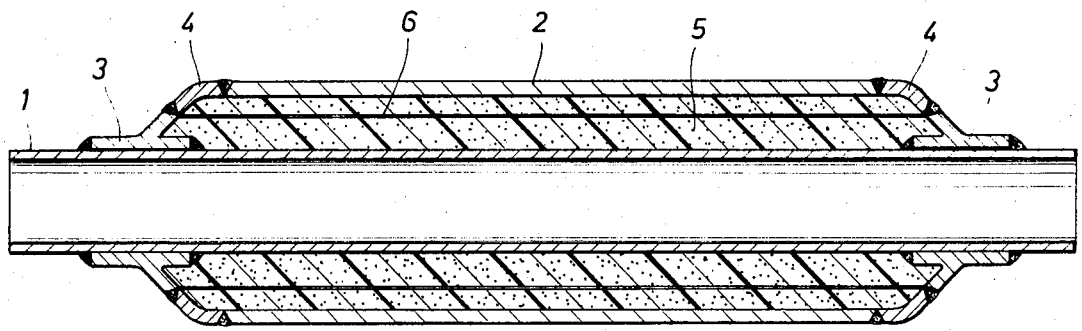
FIG. 1 represents a diagrammatic longitudinal cross-section of an embodiment of a line or line section of the restrained type.

Referring now to the drawings and particularly to FIG. 1, the line or line section shown therein comprises an inner pipe 1, manufactured from a suitable material retaining its ductility at the low temperature of the liquid gas, for example manufactured from from 9 percent nickel steel. Coaxial with the inner pipe 1 is an outer pipe 2 having a larger diameter than the inner pipe 1. This pipe 2 is made form a suitable material, for example, carbon steel. The ends of the inner pipe 1 and the outer pipe 2 are connected by means of connections 3 and 4, for example, by means of the welded joints as indicated in the figure. The connections 3 and 4 are also manufactured from a suitable material, for example part 3 form 9 percent nickel steel and part 4 from stainless steel.

The space between the inner and outer pipe is filled with a suitable heat-insulating material 5, for example polyurethane foam, preferably with closed cells. If desired, other suitable plastic foams, such as polyvinylchloride foam, may also be used.

The manufacture of the above line or line section is as follows:

The connections 3 and the connections 4 are first welded to one end of the inner pipe 1.

The inner pipe 1 is subsequently provided with a slide layer (not shown) which is several millimeters thick and does not adhere to the inner pipe 1. This layer consists of a suitable material, for instance, a felt or a fabric made from for example polypropylene, or glass fiber. Plastic foil or paper or jute may also be used. The object of the slide layer is to allow the inner pipe 1 to move axially (as a result of temperature gradients in the longitudinal direction of the pipe) relative to the heat-insulating material 5. It is noted that the said slide layer may, if desired, be omitted. It is also possible to apply a slide layer between the outer pipe and the heat-insulating material instead of between the inner pipe and the heat-insulating material.

The plastic foam is subsequently applied to the slide layer. In the absence of a slide layer, the plastic foam is applied direct to the inner pipe 1. Polyurethane foam, for example, is applied by spraying, so that a heat-insulating layer 5 is formed.

If desired, a suitable fabric or fibrous material 6, for example a glass-fiber fabric, may be incorporated into this heat-insulating layer 5 as a crack arrester to arrest any crack formation of the heat-insulating material 5. Instead of a glass-fiber fabric it is also possible to use a fabric of a different suitable material, for example linen, cotton, jute, hemp. Instead of fabric, fibers of the said materials may also be used. It is also possible to use metal matting, manufactured from, for example, stainless steel.

After the insulating layer 5 has been applied, the outer pipe 2 is arranged and joined by welds to one connection 4. The connections 3 and 4 are then welded to the other end and connection 4 is welded to the outer pipe 2. The outer pipe 2 is arranged in such a way that at normal ambient temperatures there is no, or only slight, axial tensile stress or axial compression stress on the outer and the inner pipe.

If desired, a small space may be present between the outer pipe 2 and the insulating layer 5.

A pipeline may comprise one single section as shown in FIG. 1. However, the line may also be built up of a number of sections according to FIG. 1 which are connected in series.

In order to counteract floating up of the line when used under water, the outer pipe 2 may be provided on the outside with a concrete jacket (not shown) or other ballast means. It is also possible to attach anchoring means to the outer pipe 2.

When the line or line section according to FIG. 1 is taken into normal use, i.e. when cold liquid (for example liquid natural gas at approximately minus 160° C) is passed through the inner pipe 1, this pipe will cool and shrink. Since the ends of the inner pipe 1 are connected to the ends of the outer pipe 2, axial tensile stress will develop in the inner pipe 1 and axial compression stress in the outer pipe 2. There is reduced risk of buckling of the outer pipe 2 while under axial compression stress owing to the fact that the outer pipe 2 is supported elastically by the inner pipe 1 via the heat-insulating material 5. The insulating material 5 will prevent direct contact between the inner and outer pipes in the event of buckling.

The outer pipe 2 protects the heat-insulating material 5 against damage both during transport and during laying of the pipeline. In addition, the outer pipe 2 prevents water from penetrating into the heat-insulating material 5.

Figure 2:
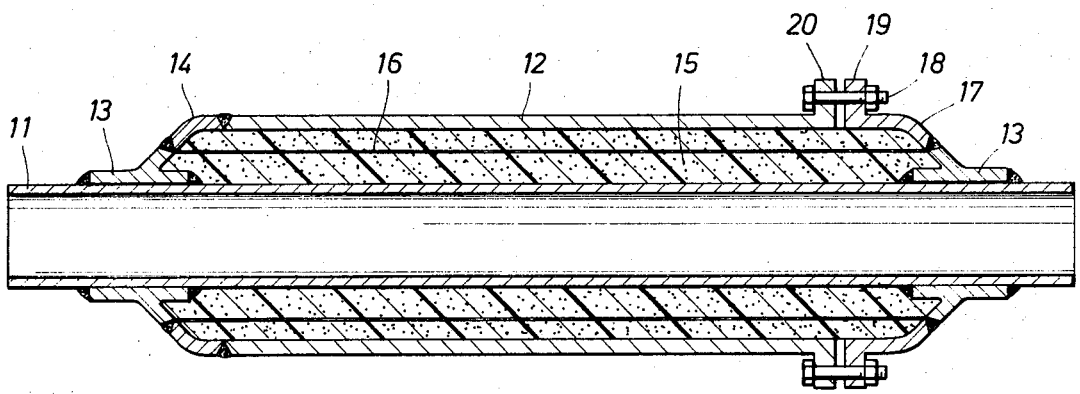
FIG. 2 is a diagrammatic longitudinal cross-section of an embodiment of a line or line section of the prestressed type.

The line or line section shown in FIG. 2 comprises an inner pipe 11 manufactured from a suitable material which retains its ductility at the low temperature of the liquid gas, for example from 9 percent nickel steel. An outer pipe 12 having a larger diameter than the inner pipe 11 is arranged coaxially with the inner pipe 11. The outer pipe 12 is made from a suitable material, for example from carbon steel. Connections 13 are secured to the inner pipe 11, for instance by welded joints. At one end of the line section a connection 14 is welded to the connection 13. At the other end of the line section an element 17 provided with a flange 19 is welded to the connection 13. The connections 13 are made from a suitable material, for example 9 percent nickel steel. The connections 14 is made from, for example, stainless steel, as is the element 17.

The outer pipe 12 is welded at one end to the connection 14. At the other end the outer pipe 12 is provided with a flange 20 which is secured to the flange 19 by means of bolts 18.

The space between the inner and outer pipe is filled with a suitable heat-insulating material 15, for example polyurethane foam, preferably with closed cells. If desired, other suitable plastic foams, such as, for example, polyvinylchloride foam may also be used.

The above line or line section is constructed as follows: The connections 13 are first welded onto the inner pipe 11 and a connection 14 is subsequently welded to the part 13 at one end of the line section.

The inner pipe 11 is then provided with a slide layer (not shown) which is several millimeters thick and does not adhere to the inner pipe 11. This slide layer consists of a suitable material for example a felt or a fabric made from e.g. polypropylene or glass fiber. Paper or jute may also be used. The object of the slide layer is to allow the inner pipe 11 to move axially (as a result of temperature gradients in the longitudinal direction of the pipe) relative to the heat-insulating material 15. It should be noted that the said slide layer may, if desired, be omitted.

The plastic foam is subsequently applied to the slide layer. If the slide layer is not used, the plastic foam is applied direct to the inner pipe 11. Polyurethane foam, for example, is applied by spraying, so that a heat-insulating layer 15 is formed. Alternatively, foaming in situ may be applied or scales of polyurethane foam may be used.

If desired, a suitable fabric or fibrous material 16, for example, a glass-fiber fabric, may be incorporated as a crack arrester into this heat-insulating layer 15 in order to arrest crack formation of the heat-insulating material 15. Instead of a glass-fiber fabric, it is also possible to use a fabric of a different suitable material, for example linen, cotton, jute, hemp. Instead of a fabric, fibers of the said materials may also be used. It is also possible to use metal matting, manufacture from, for example, stainless steel.

After the insulating layer 15 has been completed, the outer pipe 12 is arranged. One end of the outer pipe 12 is welded to the left-hand connection 14. A part 17 with a flange 19 is welded to the right-hand connection 13. The flange 20 is secured to the flange 19 by means of bolts 18. The bolts 18 are subsequently tightened to bring the outer pipe 12 under a relatively large axial tensile stress. This results in the inner pipe 11 being subjected to axial compression stress. If desired, packing may be provided between the flanges 19 and 20 to ensure a gas-tight seal.

It was stated above that prestressing the inner pipe and outer pipe is effected by means of flanges and bolts. It will be evident that prestraining can be achieved in numerous other ways. Consequently, the invention is not limited to prestraining of the inner pipe and the outer pipe by means of flanges and bolts.

A pipeline may consist of a single section as shown in FIG. 2. However, the line may instead be built up of a number of sections shown in FIG. 2, which are connected in series.

When the line or line section according to FIG. 2 is taken into normal use, i.e. when cold liquid (for example liquid natural gas at approximately minus 160° C) is passed through the inner pipe 11, this pipe will cool and shrink. This means that the prestress, i.e. the axial compression stress in the inner pipe, will be reduced. Simultaneously the prestress, i.e. the axial tensile stress, in the outer pipe will be reduced. The magnitude of the prestress applied and the temperature of the cold liquid which is passed through the inner pipe 11 determined the magnitude of the axial stresses remaining in the inner pipe and outer pipe. For example, a relatively small axial compression stress in the inner pipe 11 and a relatively small axial tensile stress in the outer pipe 12 may remain. In some cases the axial stresses may disappear completely both in the inner pipe 11 and in the outer pipe 12 as a result of cooling of the inner pipe 11 or the axial stresses may even change sign.

There is no risk of buckling of the inner pipe 11 or outer pipe 12 while under axial compression owing to the fact that the inner pipe and outer pipe support each other elastically via the heat-insulating material 15.

The outer pipe 12 protects the heat-insulating material 15 against damage, both during transport and during laying of the pipeline. Moreover, the outer pipe 12 prevents water from penetrating into the heat-insulating material 15.

When a pipeline is built up by connecting a number of sections of the type according to FIG. 1 or FIG. 2 in series, the displacements of the inner pipes 1 or of the inner pipes 11 through expansion or shrinkage along the pipeline will be relatively small. The displacements will be determined by the lengths of the line sections used. This means that a relatively large temperature gradient along the pipeline is admissible. This is of particular importance when bringing the lines into operation and taking the line out of operation.

In all the above-mentioned embodiments of the line or line section, the connection between the ends of the inner pipe and the outer pipe can be effected in numerous ways. The connection between the ends of the inner pipe and outer pipe shown in FIGS. 1 and 2 are only given to elucidate the principle underlying the invention.

Figure 3:
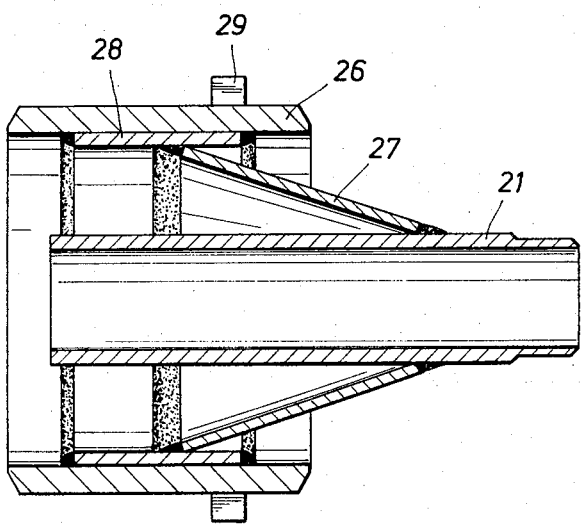
FIG. 3 is a diagrammatic longitudinal cross-section of an embodiment of a connection for connecting the inner and outer pipes.

A possible connection for coupling the ends of the inner pipe and outer pipe together is shown in FIG. 3.

This connection comprises a conical element 27, having the shape of a truncated hollow cone, one end of which is attached by welding onto the outer surface of the inner pipe 21. This conical element 27 is made of a suitable material, for example 9 percent nickel steel. An inner ring 28 is attached by welding onto the other end of the conical element 27. This inner ring 28 is manufactured from, for example, stainless steel. An outer ring 26 is fitted onto the inner ring 28 and rigidly secured to the latter by welding. The outer ring 26 is made from, for example, carbon steel. If desired, the outer ring 26 is provided with cams 29. These cams 29 may be used it if is desired to prestress the line or line section in advance.

Figure 4:
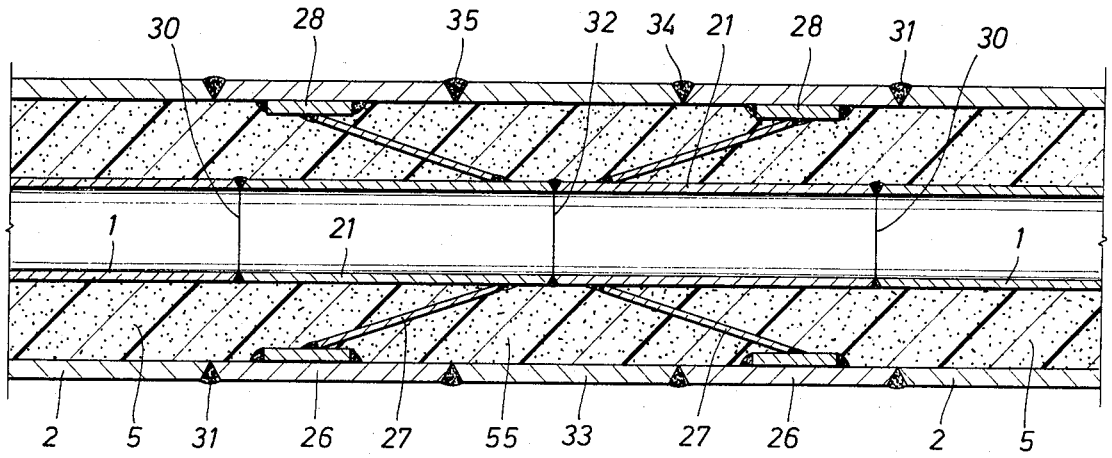
FIG. 4 is a diagrammatic longitudinal cross-section of an embodiment of a coupling between two line sections of the restrained type.

FIG. 4 shows a coupling between two line sections of the restrained type, i.e. line sections based on the principle shown in FIG. 1.

The inner pipe 21 is connected to the inner pipe 1 of a line section by means of a welded joint 30, while the outer ring 26 of each connection is connected to the outer pipe 2 of a line section by means of a welded joint 31. As mentioned above, the space between the inner pipe 1 and the outer pipe 2 is filled with a heat-insulating material 5, for example polyurethane foam.

The inner pipes 21 are interconnected by a welded joint 32. The outer rings 26 are connected by means of a ring 33. This ring 33 may comprise two or more scales welded together.

The ring 33 is made from a suitable material, for example carbon steel. The ring 33 is connected on either side to the outer ring 26 by means of welded joints 34 and 35. The space bounded by the inner pipes 21, the conical elements 27, the outer rings 26 and the ring 33 is also filled with heat-insulating material 55, for example polyurethane foam. This heat-insulating material may be in the form of scales; it may be applied in situ by spraying or by foaming. The heat-insulating material 5 or 55 may, if desired, be reinforced by a fabric or fibrous material (crack arrester) in the manner described above.

The ring 33 is not prestressed nor are the outer pipes 2 and the outer rings 26. Consequently, these parts are simply welded together.

The rings 26 are not provided with the cams 29, there being no need to do so in this case since prestressing in advance is not required.

Figure 5:
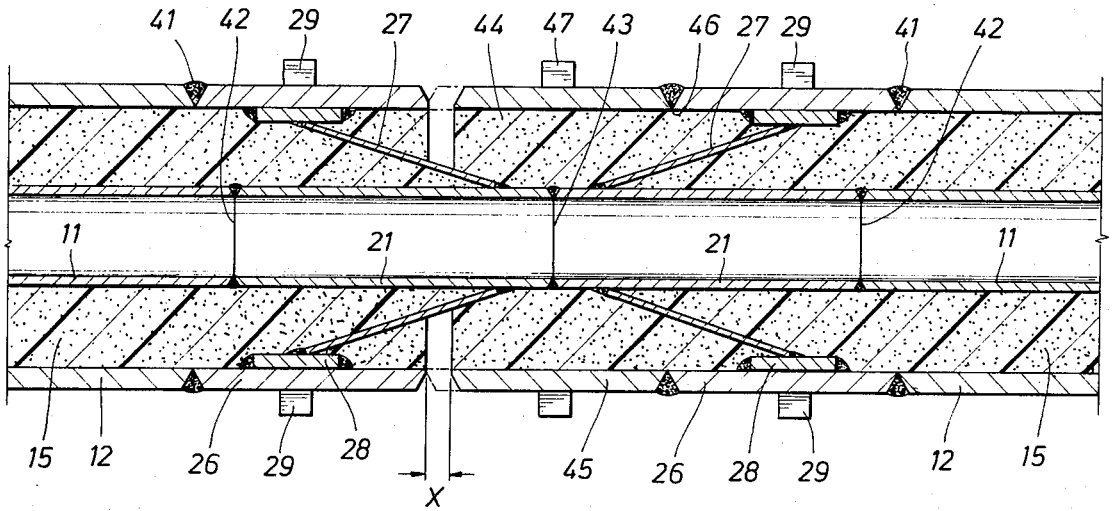
FIG. 5 is a diagrammatic longitudinal cross-section of an embodiment of a coupling between two line sections of the prestressed type.

FIG. 5 shows a coupling between two line sections of the prestressed type, i.e. two line sections based on the principle shown in FIG. 2.

In the line section shown on the left and right-hand sides in FIG. 5, the inner pipe 11 is connected with the outer pipe 12 in such a manner that the outer pipe 12 is under tension and the inner pipe is under compression (if the inner and the outer pipes are at normal ambient temperature). The outer ring 26 is connected to the outer pipe 12 by a welded joint 41 and the inner pipe 21 with the inner pipe 11 by means of a welded joint 42.

Heat-insulating material 15, for example polyurethane foam, is present between the inner pipe 11 and the outer pipe 12 in the manner described above.

The inner pipes 21 are connected by means of a welded joint 43. After the joint 43 has been completed heat-insulating material 44, for example polyurethane foam, is applied. The heat-insulating material may be applied in situ by spraying or by foaming or in the form of scales.

A ring 45, which may consist of two or more scales, is subsequently welded to the right-hand outer ring 26 by means of a welding joint 46. The scales forming the ring 45 are also welded together. Cams 47 are secured onto the outer surface of the ring 45. However, instead of the cams 47 ring segments may be used.

After the ring 45 has been secured, such an axial force is exerted on the cams (or ring segments) 47 and 29 that the left-hand rim of the ring 45 comes into contact (see dotted position) or virtual contact (so that the opening X disappears) with the right-hand rim of the left-hand outer ring 26, the said rims being subsequently welded together. Alternatively, this object may also be achieved by exerting the said axial force on the left and right-hand cams 29.

After the latter joint has been welded and the axial force exerted from outside has been eliminated, the ring 45 is under axial tensile stress and the parts of the inner pipes 21 situated near the weld 43 and between the conical elements 27 are under axial compression stress. The resultant coupling is therefore prestressed, as are the relevant line sections. It should be noted that the ring 45 is made from a suitable material, for example carbon steel.

It should be noted that in the case of couplings as shown in the FIGS. 4 and 5, the welds 32 and 43 may each be replaced by a flange coupling, if desired.

Figure 6:
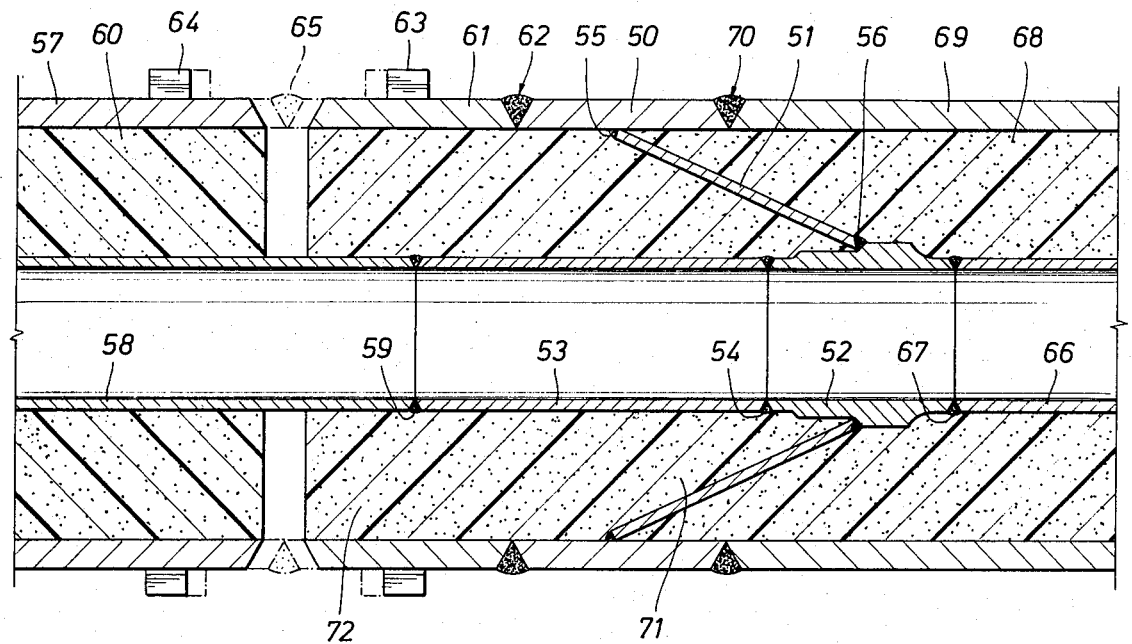
FIG. 6 shows a possible method for constructing a pipeline consisting of sections.
Figure 7:
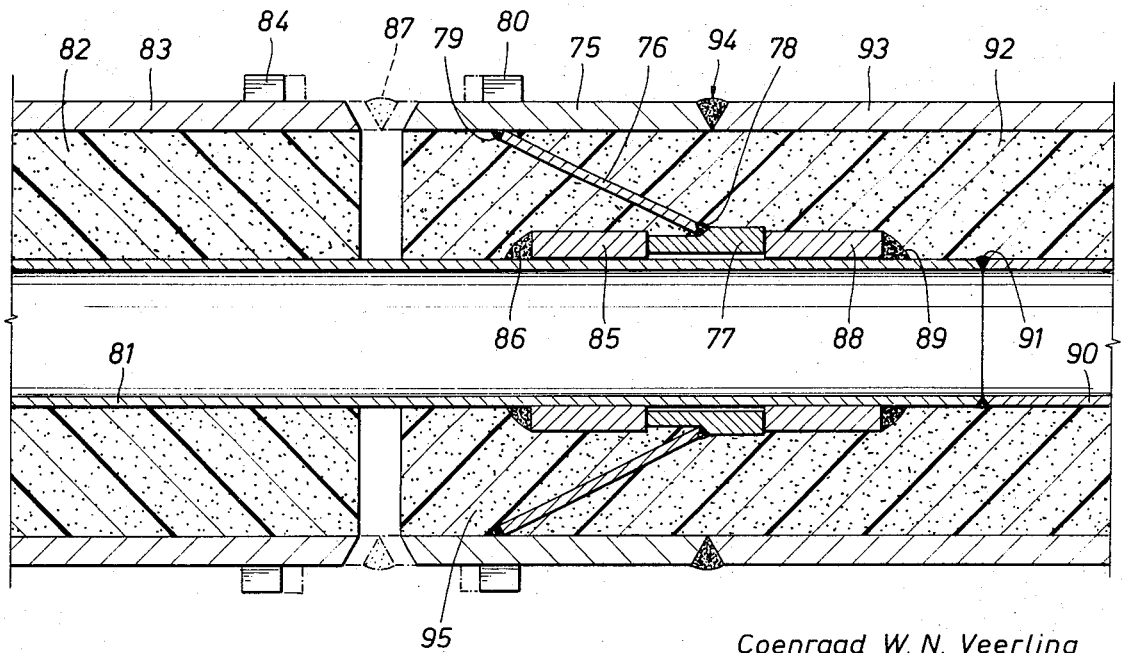
FIG. 7 shows another possible method for constructing a pipeline consisting of sections.

FIGS. 6 and 7 show methods for the construction of a pipeline consisting of sections.

The connection comprising the parts 50, 51, 52, 53, 54, 55, which is provided with an insulation 71, is produced in advance. A pipeline section consisting of an inner pipe 58, an outer pipe 57 and an insulating material 60 has already been laid in place. The inner pipe 53 of the said connection is subsequently welded (weld 59) to the inner pipe 58. Then an insulating material 72 is applied. An outer ring 61 (consisting of scales) is connected to the outer ring 50 by means of a weld 62.

Cams 64 are present on the outer pipe 57 and cams 63 on the outer ring 61. An axial force is exerted on these cams, as a result of which the ring 61 is stretched and the space between the outer pipe 57 and the outer ring 61 is eliminated. A weld 65 is subsequently made at the place indicated by the broken line, connecting the parts 57 and 61. The axial force is then eliminated from the cams 63 and 64, leaving an axial tensile stress in the parts 57 and 61 and an axial compression stress in the parts 58 and 53.

Then, the next section is built up. An inner pipe 66 is joined to the inner ring 52 by a weld 67. Heat-insulation 68 is arranged, and an outer pipe 69, whereupon a weld 70 is made. The operations described above are then repeated at the right-hand side of the pipe section consisting of the parts 66 and 69, and so on until the pipeline has attained the desired length.

The method according to FIG. 7 is as follows:

The connection 75, 76, 77, 78, 79 is produced in advance. A pipeline section comprising an inner pipe 81, an outer pipe 83 and an insulating material 82 has already been laid in place. A ring 85 (optionally in sections) is arranged on the inner pipe 81 and welded thereto by a weld 86. Then insulation 95 is applied. The connection 75–79 is subsequently slid on the inner pipe 81 against the ring 85. Cams 84 are present on the outer pipe 83 and cams 80 on the outer ring 75. An axial force is then exerted via the said cams as a result of which the ring 75 is stretched axially and the space between the parts 75 and 83 disappears. A weld 87 is then made at the place indicated by the broken line, connecting the parts 75 and 83. Finally, the axial force is eliminated from the cams, leaving an axial tensile stress in the parts 75 and 83 and an axial compression stress in the inner pipe 81.

A ring 88 (optionally in sections) is now arranged on the inner pipe 81 and welded thereto by a weld 89. An inner pipe 90 is welded to the inner pipe 81 by a weld 91. An insulation 92 is arranged and finally the outer pipe 93 which is welded to the outer ring 75 by a weld 94.

The operations described above are then repeated at the right-hand side of the pipe section, consisting of the parts 92 and 93, and so on until the pipeline has attained the desired length.

If use is made of a pipeline based on the above principles, and running from a point on land to a point offshore (for instance near a jetty, mooring-island or mooring-buoy), the end of the pipeline may, if desired, be anchored to the sea-bed at the latter point, while the end of the pipeline on land may be secured freely movable axially.

Prestressing of the line sections or of a "growing" pipeline during assembly may be effected in various ways, for example mechanically and hydraulically by means of hydraulically driven pipe clamps with which the outer pipe is brought under tension and the inner pipe under compression.

It is also possible to use a thermal method. In this method, the inner pipe is cooled or the outer pipe heated, the ends of the inner pipe and the outer pipe being subsequently connected. Cooling may, for example, be effected with the aid of solid $CO_2$ or liquid $N_2$.

We claim as our invention:

1. A pipeline for the transport of cold liquids comprising sections of an inner pipe a coaxial outer pipe having a larger diameter than the inner pipe, the ends of the inner pipe and the outer pipe being connected to each other to form a gas-tight space between said inner and outer pipes, one of said inner or outer pipes being in axial compression, a plastic foam heat-insulating material filling said gas-tight space so that upon buckling of one of the pipes direct contact between said pipes is prevented by the heat-insulating material, a crack arrester coaxially aligned with said pipes and embedded in said foam, and a slide layer between at least one of said pipes and the heat-insulating material to allow said one of said pipes to move relative to said heat-insulating material.

2. A pipeline as claimed in claim 1, further characterized in that the ends of the inner pipe and the outer pipe are connected each other so that, at ambient temperature, no more than slight axial stresses occur in the inner and outer pipes, and at operating temperature an axial tensile stress occurs in the inner pipe and an axial compression stress occurs in the outer pipe.

3. A pipeline as claimed in claim 1, further characterized in that the inner and outer pipes are connected to each other so that, at ambient temperature, the outer and inner pipes are prestressed so that the outer pipe is under axial tension and the inner pipe is under axial compression.

4. A pipeline as claimed in claim 1, further characterized in that the crack arrester is a layer of fabric.

5. A pipeline as claimed in claim 1, further characterized in that the plastic foam has closed cells.

6. A pipeline as claimed in claim 5, further characterized in that the heat-insulating material used is polyurethane foam.

7. A pipeline as claimed in claim 5, further characterized in that the heat-insulating material used in polyvinylchloride foam.

8. A pipeline as claimed in claim 1, further characterized in that the slide layer comprises felt.

9. A pipeline as claimed in claim 1, further characterized in that the slide layer comprises polypropylene fabric.

10. A pipeline as claimed in claim 1, further characterized in that the slide layer comprises glass fiber.

11. A pipeline as claimed in claim 1, further characterized in that the slide layer comprises paper.

12. A pipeline as claimed in claim 11, characterized in that the slide layer comprises jute.

13. A pipeline as claimed in claim 1, further characterized in that the plastic foam is arranged in the form of scales.

14. A pipeline as claimed in claim 1, further characterized in that the inner pipe consists of nickel steel.

15. A pipeline as claimed in claim 1, further characterized in that the inner pipe consists of aluminum.

16. A pipeline as claimed in claim 1, further characterized in that the outer pipe consists of carbon steel.

* * * * *